United States Patent Office 3,380,996
Patented Apr. 30, 1968

3,380,996
METHOD FOR PRODUCING PURINE NUCLEOSIDES
Mikio Honjo and Kin-ichi Imai, Takatsuki, Osaka, Japan, assignors to Takeda Chemical Industries, Ltd., Osaka, Japan
No Drawing. Filed Feb. 4, 1966, Ser. No. 525,134
Claims priority, application Japan, Feb. 5, 1965, 40/6,506
5 Claims. (Cl. 260—211.5)

This invention relates to a novel method for producing purine nucleosides.

Purine nuclesides are used as, for example, important intermediates for producing purine 5′-nucleotides which are used widely in food industries, or as medicines or biochemical reagents for various purposes.

Heretofore, there have been many reports that purine nucleoside was produced by the condensation reaction between a purine base or a derivative thereof and a monosaccharide or a derivative thereof. The syntheses described in those reports are divided into two main methods depending on the functional groups of the starting materials, i.e. one method comprises condensing a heavy metal salt or a trimethylsilyl derivative of the purine with a 1-halogenated derivative of monosaccharide, and the other method comprises condensing a purine base or an N-acylate thereof with a 1-O-acylmonosaccharide.

However, the first of these methods is practically inapplicable to the production of purine nucleosides due to various drawbacks; for example, first, there has to be used the 1-halogenated monosaccharide, which is per se quite unstable and has to be prepared from the 1-acylmonosaccharide which is per se the starting material of the other method; secondly, the use of the heavy metal salt of the purine may give a product which contains an inseparable amount of the toxic heavy metal, which makes the product unsuitable for consumption by human beings; thirdly, the yield of the condensation is inevitably low; and so on.

While the second method is certainly better than the first, it still is not free from drawbacks; for example, the yield is not sufficiently high even when any known catalyst is used and purification of the product is difficult because of the formation of a comparatively large amount of by-products during the condensation reaction. Therefore, there has been a problem to be solved as to how to increase the yield of the desired condensate and how to lessen the by-products.

A principal object of this invention is to obviate the prior art defects and to provide an improvement in the form of a novel and improved method for the production of purine nucleosides.

The aforesaid object is realized by melting both starting materials (I) and (II) together under heating in the presence of a halogen compound consisting of halogen atoms, the starting material (I) being a compound having formula:

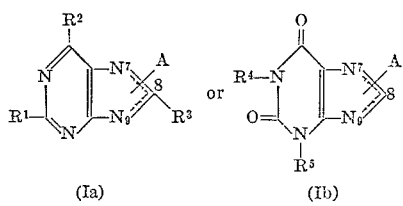

(Ia)        (Ib)

wherein each of R¹, R² and R³ is H, hydroxy, acyloxy, amino, acylamino, alkylthio or halogen, the acyl of the acyloxy or of the acylamino being a carboxylic acyl having up to and including eighteen carbon atoms; each of R⁴ and R⁵ is a lower alkyl having up to and including four carbon atoms; A, being attached to the nitrogen atom at the position 7 or 9, is H or a carboxylic acyl having up to and including eighteen carbon atoms; and the dotted line shows a double bond at the position 8 or 7; and the other starting material (II) being a compound represented by the formula:

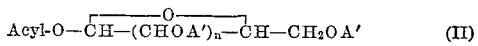

wherein Acyl is a carboxylic acyl having up to and including seven carbon atoms, A′ is hydrogen or a carboxylic acyl having up to and including seven carbon atoms; and $n$ is an integer from 2 to 3.

More concretely, in Formula Ia or Ib, $R^1$, $R^2$ and $R^3$ represent, respectively, H, halogen (such as chlorine, bromine or iodine), hydroxy, amino, acylamino (such as formamido, acetamido, propionylamido, benzoylamido, capryloylamido, myristoylamido or stearoylamido), lower alkylthio (such as methylthio, ethylthio or butylthio), or acyloxy (such as formyloxy, acetoxy, propionyloxy, butyryloxy, valeroxy, benzoyloxy, capryloyloxy, myristoyloxy or stearoyloxy); $R^4$ and $R^5$ are lower alkyl (such as methyl, ethyl, butyl or isobutyl); and A is H or carboxylic acyl (such as formyl, acetyl, propionyl, butyryl, valeryl, benzoyl, capryloyl, myristoyl or stearoyl).

In connection with Formula II, the carboxylic acyl group represented by Acyl or A′ is, for example, formyl, acetyl, trifluoroacetyl, monochloroacetyl, propionyl, butyryl, valeryl, benzoyl or paranitrobenzoyl.

The expression "halogen compound consisting of halogen atoms" means a compound in which the atoms constructing the molecule are all halogen or halogens, and includes, for example iodine, bromine or iodine trichloride.

When both compounds of Formulas I and II are heated in the presence of the halogen compounds at a temperature ranging from about 120° C. to 195° C., the condensation reaction takes place. The reaction may be effected under atmospheric or reduced pressure. It is usually advantageous to allow the reaction to start under atmospheric pressure, and then to complete it under reduced pressure.

The necessary amount of a halogen compound as the catalyst is rather small, i.e. 0.1 to 10%, preferably 0.5 to 1.5% by weight relative to the total weight of the starting materials (I) and (II).

The halogen compound may be added to the reaction mixture at one time or successively little by little, and it may be added prior to the heating.

After completion of the reaction as described above, the resulting condensate is easily recoverable, if desired, by a per se conventional means. For example, it may be extracted with an organic solvent such as chloroform or dichloromethane. In the thus-obtained condensate, the hydroxyl groups of the sugar part may be free or acylated, depending upon the starting material (II) used. In the latter case, the O′-acyl condensate is easily convertible, if desired, to the O′-free one through a per se conventional alkali hydrolysis by the use of alkali metal alkoxide such as sodium methoxide or potassium ethoxide.

In like manner, numerous purine nucleosides are advantageously producible, including, for example:

(1) 7-β-D-glucopyranosyltheophylline;
(2) 7-β-D-ribofuranosyltheophylline;
(3) 2,6-diamino-9-β-D-glucopyranosylpurine;
(4) 9-β-D-glucopyranosylpurine;
(5) 7-(2′,3′,5′-tri-O-benzoyl-β-D-ribofuranosyl)theophylline;
(6) 2,6-diacetamido-9-(2′,3′,5′-tri-O-benzoyl-β-D-ribofuranosyl)purine;
(7) 2,6-dichloro-9-(2′,3′,5′-tri-O-acetyl-β-D-ribofuranosyl)purine;

(8) 2,6-dichloro-9-(2',3',5'-tri-O-benzoyl-β-D-ribofuranosyl)purine;
(9) 2,6-dihydroxy-9-(2',3',5'-tri-O-formyl-β-D-ribofuranosyl)purine;
(10) 2,6-diacetamino-9-(2',3',5'-tri-O-propionyl-β-D-ribofuranosyl)purine;
(11) 2,6-diacetoxy-7-(2',3',5'-tri-O-acetyl-β-D-ribofuranosyl)purine;
(12) 1,3-diethyl-7-(2',3',5'-tri-O-butyryl-β-D-ribofuranosyl)xanthine;
(13) 9-(2',3',5'-tri-O-acetyl-β-D-ribofuranosyl)purine;
(14) 2,6-dichloro-9-(2',3',4',5'-tetra-O-benzoyl-β-D-glucopyranosyl)purine;
(15) 7-(2',3',4',5'-tetra-O-benzoyl-β-D-glucopyranosyl)theopylline;
(16) 2-methylthio-6-acetamido-9-(2',3',5'-tri-O-acetyl-β-D-ribofuranosyl)purine;
(17) 2,6,8-trichloro-9-(2',3',5'-tri-O-acetyl-β-D-ribofuranosyl)purine;
(18) 6-acetamido-8-methylthio-9-(2',3',5'-tri-O-acetyl-β-D-ribofuranosyl)purine;
(19) 2,6-distearoylamido-9-(2',3',5'-tri-O-acetyl-β-D-ribofuranosyl)purine;
(20) 2,6-dimyristoyloxy-9-(2',3',5'-tri-O-benzoyl-β-D-ribofuranosyl)purine.

In the method of this invention, the reaction proceeds mildly accompanied with far less by-products than when use is made of any known catalyst, and therefore the desired condensate can be obtained with better yield and also subsequent treatments are easily carried out. For the purpose of giving those skilled in the art a further understanding of the invention, the following illustrative examples of presently preferred embodiments are given.

In these examples, the abbreviations "g.," "mg.," "ml.," "° C.," "M" and "N" mean "gram(s)," "milligram(s)," "milliliter(s)," "degrees centigrade," "molal" and "normal" respectively.

Temperatures are all uncorrected and percentages are all on the weight basis.

Example 1

5.0 g. of 1-O-acetyl - 2,3,5 - tri-O-benzoyl-β-D-ribofuranose is heated to melt on an oil bath (140–145° C.), followed by the addition of 1.38 g. of 2,6-diacetamido-9(or 7)-acetyl purine (melting at 245–248° C. with decomposition) and 200 mg. of iodine. The mixture is heated with agitation for 5 minutes under atmospheric pressure, and then for 15 minutes under reduced pressure of 20 mm. Hg on an oil bath (170–175° C.).

After cooling, the reaction mixture is extracted with 100 ml. of chloroform, and then the chloroform is distilled off to leave a crude condensate of the reaction.

70 ml. of 2.5% sodium methoxide is added to the resulting residue. The mixture is heated under reflux for an hour. The reaction mixture is neutralized with acetic acid and concentrated under reduced pressure. To the resulting mixture, 1 N-aqueous ammonia solution is added to make the solution alkaline. The obtained solution is allowed to pass through a column (3.5 cm. in diameter x 37 cm. in length) of "Dowex–1 X–8" (trade name of The Dow Chemical Co., 100–200 mesh, chloride form). The column is eluted with 3550 ml. of 0.01 M-ammonium chloride buffer solution (pH 10.5).

After being treated with activated charcoal for removing the coexisting inorganic salts, the solution is concentrated to about 3 ml. and allowed to stand to give crystals. The crystals are collected by filtration and recrystallized from water to give 792 mg. of 2,6-diamino-β-D-ribofuranosylpurine as colorless prisms melting at 238° C. Yield is 59% on the 2,6-diacetamide-9(or 7)-acetylpurine employed.

*Elementary analysis.*—Calculated for $C_{10}H_{14}O_4N_6$: C, 42.55%; H, 5.00%; N, 29.78%. Found: C, 42.37%; H, 5.28%; N, 29.64%.

Specific rotation $[\alpha]_D^{22} = -39.5°$ C. (0.65%, in 0.1 N-hydrochloric acid).

Employment of 80 mg. of bromine instead of 200 mg. of iodine in this example gives substantially the same result as above.

When p-toluenesulphonic acid is used as a known catalyst instead of iodine in the above described process, 50% yield of crude 2,6-diamino-9-β-D-ribofuranosylpurine is obtained.

Example 2

1.512 g. of 1-O - acetyl - 2,3,5-tri-O-benzoyl-β-D-ribofuranose is heated to melt on an oil bath, followed by the addition of 540 mg. of theophylline and 30 mg. of iodine. The mixture is further heated for 5 minutes under atmospheric pressure and then for 20 minutes under reduced pressure on an oil bath (160–165° C.).

In the same manner as in Example 1 the reaction mixture is extracted with chloroform, and treated with sodium methoxide. The reaction mixture is purified by Dowex ion-exchange resin as in Example 1 to obtain 759 mg. of 7-β-D-ribofuranosyltheophylline as colorless needles melting at 188–190° C. Yield is 81% on the theophylline employed.

*Elementary analysis.*—Calculated for $C_{12}H_{16}O_6N_4$: N, 17.94%. Found: N, 17.93%.

Employment of 20 mg. of iodine trichloride instead of 30 mg. of iodine in the above-mentioned procedure in this example gives substantially the same result as above.

When p-toluenesulfonic acid is used as a known catalyst instead of iodine in the above described process, 62% yield of crude 7-β-ribofuranosyltheophylline is obtained.

Example 3

16.9 g. of 1,2,3,5-tetra-O-acetyl - D - ribofuranose is heated to melt on an oil bath (130° C.), followed by the addition of 9.5 g. of 2,6-dichloropurine and 250 mg. of iodine. The mixture is heated on an oil bath (130–135° C.) under reduced pressure of 20 mm. Hg for 15 minutes.

After cooling, the reaction mixture is extracted with 200 ml. of dichloromethane.

The dichloromethane solution is allowed to pass through a column packed with 500 g. of silica gel. The column is eluted with dichloromethane, and then the solvent is distilled off to leave 20 g. of 2,6-dichloro-9-(2',3',5'-tri-O-acetyl-β-D-ribofuranosyl)purine as colorless sirup. Yield is 90% on the 2,6-dichloropurine employed.

Employment of 80 mg. of bromine instead of 250 mg. of iodine in the above-mentioned procedure in this example gives substantially the same result as above.

When sulphamic acid is used as a known catalyst instead of iodine in the above described process, 75% yield of crude 2,6 - dichloro - 9-(2',3',5'-tri-O-acetyl-β-D-ribofuranosyl)purine is obtained.

Example 4

2.5 g. of 1-O-acetyl-2,3,5-tri-O-benzoyl-β-D-ribofuranose is heated to melt on an oil bath (140–145° C.), followed by the addition of 1.2 g. of 6-benzamidopurine and 50 mg. of iodine. The mixture is heated on an oil bath 160–170° C.) under atmospheric pressure for 15 minutes and then under reduced pressure of 20 mm. Hg for 30 minutes.

After cooling, the reaction mixture is extracted with 40 ml. of chloroform and then the chloroform is distilled off. To the resulting residue, 50 ml. of 2.5% sodium methoxide solution is added and the mixture is heated under reflux for 30 minutes.

The reaction mixture is neutralized with acetic acid and concentrated. To the residue, a small amount of water is added and concentration repeated to leave a light brown residue, which is crystallized from water to obtain 0.6 g. of adenosine as colorless crystals melting at 230° C. Yield is 45% on the 6-benzamidopurine employed.

*Elementary analysis.*—Calculated for $C_{10}H_{13}O_4N_5$: C, 44.94%; H, 4.90%; N, 26.21%. Found: C, 45.15%; H, 5.12%; N, 26.49%.

Specific rotation $[\alpha]_D^{25} = -60.0°$ (0.7%, in water).

Employment of 20 mg. of bromine instead of 50 mg. of iodine in the above-mentioned procedure in this example gives substantially the same result as above.

When p-toluenesulphonic acid is used as a known catalyst instead of iodine in the above-described process, 35% yield of crude adenosine is obtained.

Example 5

7.6 g. of 1-O-acetyl-2,3,5-tri-O-benzoyl-β-D-ribofuranose is heated to melt on an oil bath (140–145° C.), followed by the addition of 2.7 g. of acetylhypoxanthine and 150 mg. of iodine. The mixture is heated under atmospheric pressure for an hour and then under reduced pressure of 20 mm. Hg for 30 minutes on an oil bath (170–175° C.).

In the same manner as in Example 4, the reaction mixture is allowed to pass through a column of "Dowex–50" (trade name of The Dow Chemical Co., 100–200 mesh, H+ form) and the column is eluted with water. The eluate solution is concentrated under reduced pressure to obtain inosine as colorless crystals. (Yield 12% on the acetylhypoxanthine.)

Employment of 100 mg. of iodine trichloride instead of 150 mg. of iodine in this example gives substantially the same result as above.

When ferric chloride as a known catalyst is used instead of iodine in the described above process, 2% yield of inosine is obtained.

The "Dowex–50" above referred to is sulfonated polystyrene bead type resin. The "Dowex–1" is a strongly basic anion exchanger which contains —NMe$_3$+ groups. These resins, disclosed solely by way of example and because of their ready commercial availability can be replaced with equal success by other similarly acting ion exchange resins such as "Amberlite IR–410," "Amberlite IR–411" (which contains

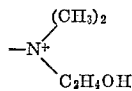

groups). "Amberlite IR–120," "Amberltie IR–200," "Amberlite IR–124" and Zeo-Karb 225 may also be used instead of "Dowex–50," and "Amberlite IRA–400," "Amberlite IRA–401," "Amberlite IRA–405" and "Amberlite IRA–425" may also be used instead of "Dowex–1."

What is claimed is:

1. In the synthesis of a purine nucleoside by the condensation between (I) a compound of one of the formulae:

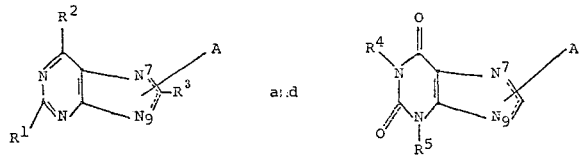

wherein each of R$^1$, R$^2$ and R$^3$ is a member selected from the group consisting of H, hydroxy, acyloxy, amino, acylamino, lower alkylthio and halogen, the acyl of the acyloxy and of the acylamino being a carboxylic acyl having a maximum of eighteen carbon atoms, each of R$^4$ and R$^5$ is alkyl having a maximum of four carbon atoms, A is attached to the nitrogen atom at the position 7 or 9 and is a member selected from the group consisting of H and carboxylic acyl having a maximum of eighteen carbon atoms, and the dotted line shows a double bond at one of the positions 8 and 7, and (II) a compound of the formula:

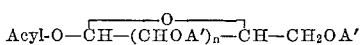

wherein Acyl is acyl of carboxylic acid having a maximum of seven carbon atoms, A' is a member selected from the group consisting of H and carboxylic acyl having a maximum of seven carbon atoms, and $n$ is an integer from 2 to 3, the improvement comprising heating to a temperature of 120° to 195° C. an intimate admixture of compounds (I) and (II) and of a halogen compound consisting of halogen atoms selected from the group consisting of Cl, Br and I, and recovering the resultant purine nucleoside.

2. The improvement as claimed in claim 1, wherein the halogen compound is iodine.

3. The improvement as claimed in claim 1, wherein the halogen compound is bromine.

4. The improvement as claimed in claim 1, wherein the halogen compound is iodine trichloride.

5. The improvement as claimed in claim 1, wherein the reaction mixture is heated to a temperature ranging from 120° C. to 195° C.

References Cited

UNITED STATES PATENTS 2,482,069  9/1949  Ruskin _____ 260—211.5
3,225,029  12/1965  Yamaoka _____ 260—211.5

LEWIS GOTTS, *Primary Examiner.*

J. BROWN, *Assistant Examiner.*